United States Patent Office 2,806,880
Patented Sept. 17, 1957

2,806,880
PROCESS FOR PREPARING THIOSEMICARBAZIDE

Perry R. Kippur, Hamden, Conn., assignor to Olin Mathieson Chemical Corporation, a corporation of Virginia No Drawing. Application August 10, 1955,
Serial No. 527,658

6 Claims. (Cl. 260—552)

This invention relates generally to thiosemicarbazide and more particularly to a process for making the same.

Thiosemicarbazide is utilized for various purposes in the chemical industry. For example, it is an intermediate for the preparation of certain pharmaceutical compounds, fungicides, rodenticides, insecticides and the like and recently it has been found to be valuable in the form of some derivatives thereof as a tuberculostatic agent. In addition to its utility based on its biological activity, thiosemicarbazide has been utilized as a photographic reducing agent, as a constituent in the manufacture of synthetic polymers and as an analytical reagent in chemical laboratories.

Heretofore, thiosemicarbazide has been prepared by a series of steps wherein hydrazinium thiocyanate is formed, for example, by reacting dihydrazinium sulfate with potassium thiocyanate. Potassium sulfate is precipitated from the reaction mixture by adding alcohol thereto, and the hydrazinium thiocyanate is thereafter heated and evaporated to cause rearrangement thereof to form thiosemicarbazide. Such a conversion process is very difficult to control and the reaction under some conditions may reach explosive violence. In order to alleviate this condition, it has been suggested to remove the water from the reaction mixture and subsequently heat the hydrazinium thiocyanate while it is dissolved in an organic solvent, for example, ethylene glycol monomethylether. This process, however, involves a plurality of steps and also involves the utilization of organic solvents which require expensive recovery operations.

It is therefore an object of this invention to provide a process for preparing thiosemicarbazide which avoids these disadvantages. Another object of the invention is to provide a novel method for making thiosemicarbazide without the utilization of organic solvents. A further object of the invention is to provide a method for making thiosemicarbazide from inexpensive reagents in aqueous solution.

The foregoing objects are accomplished utilizing an alkali metal or ammonium thiocyanate and a suitable hydrazinium salt of a mineral acid, such as, for example, the monohydrochloride or dihydrazinium sulfate. A preferred embodiment of this invention makes use of ammonium thiocyanate and hydrazine monohydrochloride as the reactants. The former is less costly than the alkali metal thiocyanates, while the use of the monohydrochloride is advantageous since the solubility of the by-product ammonium chloride, in this case, is sufficiently large to preclude its precipitation during the crystallization of thiosemicarbazide. However, the alkali metal thiocyanates can be used in the process of the present invention and other soluble hydrazinium salts, for example, dihydrazinium sulfate.

The thiocyanate salt is dissolved in water in a concentration of about 45 to 80 percent by weight. A 75 percent solution is advantageous since it will reflux at about 130° C. at atmospheric pressure. This is an effective rearrangement temperature. A water solution of about 45 to 85 percent of the hydrazinium salt, advantageously preheated to 40 to 80° C., is slowly added to the agitated, hot thiocyanate solution, maintained at 115–140° C. The metathesis of these salts is promptly followed by the rearrangement of the hydrazinium thiocyanate to thiosemicarbazide at this temperature. Since there is no buildup of the unrearranged intermediate, hydrazinium thiocyanate, the explosion hazard, created by the sudden rearrangement of a large amount of the intermediate, is eliminated.

The addition of the hydrazinium salt solution is continued until the molar ratio of the original amount of thiocyanate to hydrazinium salt is between 1:1 and 2:1. In the preferred embodiment involving ammonium thiocyanate and hydrazine monohydrochloride, this ratio is advantageously about 1.15:1. Higher ratios of thiocyanate lead to increased losses of ammonia which become uneconomical. Lower ratio than 1:1 reduce the equilibrium concentration of product and make recovery less effective. The refluxing time, after addition of the hydrazinium component is complete, is also dependent upon the above conditions and is about 1.5 to 3 hours, preferably about 2 to 2.5 hours.

The thiosemicarbazide remains in solution at elevated temperatures and can be separated by cooling and crystallizing. The following steps are particularly advantageous: Water is added to the reaction mixture to preclude any precipitation of the product or the by-product salt, and the whole is filtered while hot (about 80° C. to 115° C.). The purpose of this step is to remove any sulfur formed during the reaction period. Upon cooling the filtrate to about 20° C. or lower, thiosemicarbazide crystallizes and is removed by filtration. The remaining filtrate is evaporated until most of the by-product salt crystallizes, and this is also removed by filtration. The liquor can then be recycled to the reaction chamber and thus any unreacted values are conserved.

Although the above process can be successfully carried out with small amounts of impurities in the reactants, the yield will be higher the more pure they are. For example, if C. P. grade hydrochloric acid is used to make the hydrazine monohydrochloride, instead of muriatic acid, an increase in the yield of up to 25 percent can be obtained.

The following examples serve to illustrate this invention without limiting it to their specific methods.

*Example I*

A solution of 162 grams of sodium thiocyanate in 150 milliliters of water was refluxed at 120° C. To this was added, dropwise with stirring, a solution of 69 grams of hydrazine monohydrochloride in 70.5 grams of water during a period of one hour. After 2 hours of additional refluxing, the reaction mixture was filtered while hot, and then cooled to 8° C. to crystallize the thiosemicarbazide. The product was filtered off, washed with 100 milliliters of water and dried overnight at 50° C. under a vacuum of 30 inches of mercury gauge. The yield was 26.7 grams of thiosemicarbazide or 29.4 percent of the theory.

*Example II*

Sodium thiocyanate and hydrazine monohydrochloride were reacted in exactly the same manner as in Example I above, with the exception that the refluxing period following the addition of the hydrazinium salt was 3 hours in this case. The reaction mixture was then diluted with 50 milliliters of water, cooled to crystallize the product and filtered. The filter cake was washed with 100 milliliters of water and dried overnight at 50° C. under a vacuum of 30 inches of mercury gauge. The yield was 28 grams or 30.8 percent of the theory of thiosemicarbazide.

*Example III*

A solution of 1827 pounds of aqueous 75 percent hydrazine monohydrochloride was stored in a feed tank maintained at a temperature of 40° C. to prevent precipitation of the salt. This was added over a 2 hour period to a refluxing (131° C.) solution comprising 1775 pounds of ammonium thiocyanate of 98 percent purity in 590 pounds of water, in a glass-lined reactor equipped with a reflux condenser. The reaction mixture was held for an additional 2 hours at this temperature to allow complete rearrangement of the hydrazinium thiocyanate to thiosemicarbazide.

After this period, 2919 pounds of preheated water was added to the mixture at such a rate that the pot temperature did not drop below 95° C. This water served to retani the ammonium chloride in solution during the crystallization of thiosemicarbazide. The mixture was then filtered hot (95°–100° C.) to remove elemental sulfur and other water insoluble impurities. The thiosemicarbazide crystallized from the filtrate upon cooling it to below 20° C., and was filtered and washed twice with a total of 800 pounds of water. The washed cake was dried under vacuum at 80° C. to give 640 pounds, or 35 percent of the theory, of thiosemicarbazide which melted at 181°–182° C. The product was found to have a purity in excess of 99 percent.

I claim:

1. A method for the production of thiosemicarbazide which comprises slowly adding a 45 percent to 85 percent by weight aqueous solution of a hydrazinium salt of a mineral acid to a 45 to 80 percent by weight aqueous solution of a thiocyanate selected from the group consisting of ammonium thiocyanate and alkali metal thiocyanates maintained at 115° C. to 140° C. until the molar ratio of thiocyanate to hydrazinium salt is within the range 1:1 to 2:1, and thereafter refluxing the mixture to produce thiosemicarbazide.

2. The method of claim 1 wherein said hydrazinium salt is hydrazine monohydrochloride and wherein said thiocyanate is sodium thiocyanate.

3. The method of claim 1 wherein said hydrazinium salt is hydrazine monohydrochloride and wherein said thiocyanate is ammonium thiocyanate.

4. The method of claim 1 wherein water is subsequently added to the reaction mixture in amount sufficient to prevent precipitation of product and byproduct salt upon subsequent cooling, wherein the reaction mixture is filtered while hot and in which the filtered reaction mixture is then cooled to precipitate thiosemicarbazide.

5. The method of claim 4 wherein said hydrazinium salt is hydrazine monohydrochloride and wherein said thiocyanate is sodium thiocyanate.

6. The method of claim 4 wherein said hydrazinium salt is hydrazine monohydrochloride and wherein said thiocyanate is ammonium thiocyanate.

References Cited in the file of this patent

FOREIGN PATENTS 907,172    Germany _____ Mar. 22, 1954

OTHER REFERENCES

Scott et al.: "J. Org. Chem.," vol. 19, May 1954, pp. 749–52.